United States Patent [19]

Ehrlich

[11] Patent Number: 4,810,027
[45] Date of Patent: Mar. 7, 1989

[54] PLATE-TYPE TRAILER CONSTRUCTION
[75] Inventor: Rodney P. Ehrlich, Monticello, Ind.
[73] Assignee: Wabash National Corporation, Lafayette, Ind.
[21] Appl. No.: 134,946
[22] Filed: Dec. 18, 1987
[51] Int. Cl.[4] .............................................. B62D 33/04
[52] U.S. Cl. ................................... 296/181; 296/191; 296/188; 52/461; 52/282
[58] Field of Search ............... 296/181, 182, 183, 188, 296/191, 208; 52/467, 461, 465, 282; 105/409; 52/465, 282

[56] References Cited

U.S. PATENT DOCUMENTS

| | | | |
|---|---|---|---|
| 2,772,913 | 12/1956 | Holan et al. | 296/183 |
| 2,974,078 | 3/1961 | Petritz et al. | 52/461 X |
| 2,991,116 | 7/1961 | Andrews | 296/181 |
| 3,301,732 | 1/1967 | Kunz | 52/461 X |
| 3,494,657 | 2/1970 | Tantlinger et al. | 296/208 |
| 4,042,275 | 8/1977 | Glassmeyer et al. | 296/183 X |
| 4,685,721 | 8/1987 | Banerjea | 296/181 |

Primary Examiner—Robert B. Reeves
Assistant Examiner—Brian Sells
Attorney, Agent, or Firm—Trexler, Bushnell, Giangiori & Blackstone, Ltd.

[57] ABSTRACT

A trailer body construction including side panels, a roof and floor. The upper ends of the side panels and roof are supported by a top rail and the lower ends of the side panels and floor are supported by a frame assembly. The top rail includes a horizontal leg having a wing member extending from the horizontal leg end and a substantially vertical leg having a ledge extending therefrom. The side panels comprise a plurality of vertical side plates having substantially abutting edges, a plurality of side laps respectively covering each pair of side plates, and a plurality of side posts overlying the side laps and plates. The side posts include flange portions that abut the side laps to form box-like side posts.

21 Claims, 2 Drawing Sheets

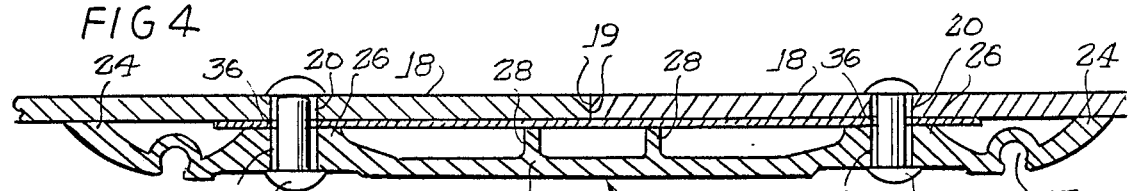
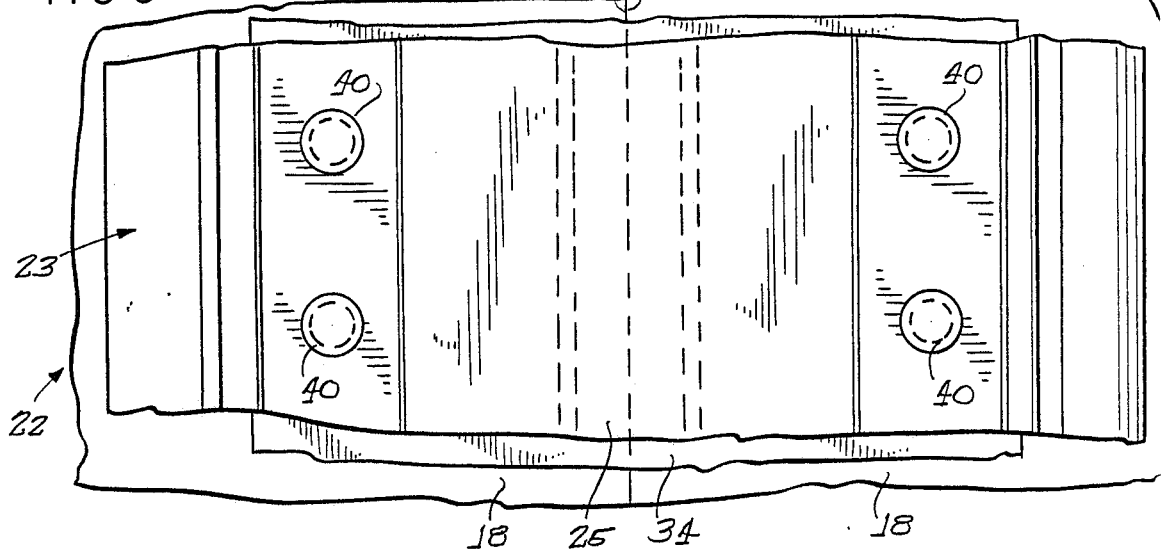
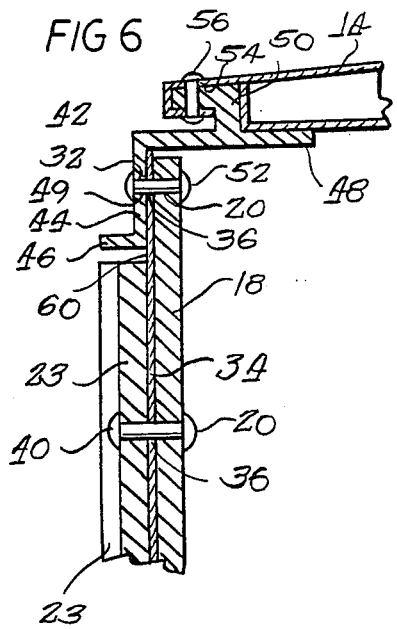
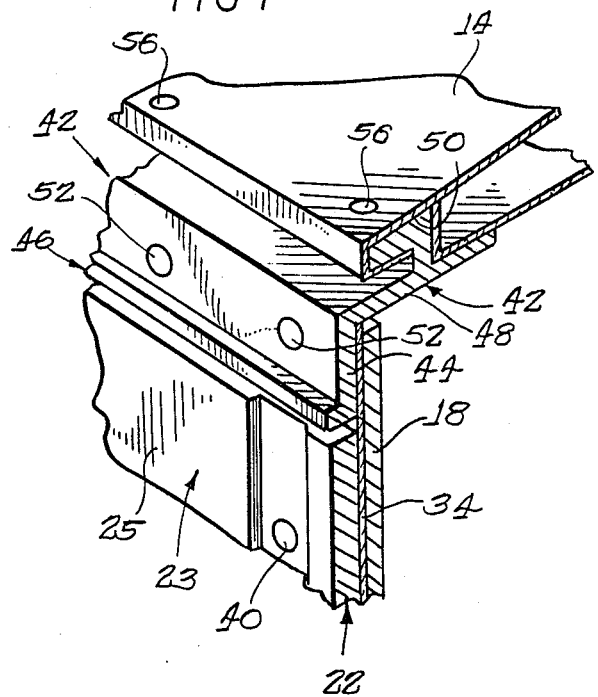

PLATE-TYPE TRAILER CONSTRUCTION

BACKGROUND OF THE INVENTION

The present invention relates generally to a plate-type trailer body, and more particularly, the invention relates to a trailer body having a plurality of aluminum box-type post assemblies for securing side plates in side-by-side relation and increasing the rigidity and strength of the panel of the trailer body.

Trailers and the like, of the general type disclosed herein, are well known and include a variety of types of side posts. A typical well known construction of a side post is known in the industry as a box-type side post. This box-type construction is desirable because it increases the strength and rigidity of the panels. However, these prior art side posts also have many disadvantages. For example, box-type side posts are complicated and expensive to manufacture. Further, they do not seal the cracks between the edges of adjacent pairs of side plates of the side panels thereby allowing water leakage.

Accordingly, a general object of the present invention is to provide a new and improved side post assembly, for use in a trailer body, which side post assembly is simple in design and economical to manufacture.

A more particular object of the present invention is to provide a novel extruded aluminum side post assembly having flanges and hollow recesses for reducing material and increasing the rigidity of the side panels.

Another object of the present invention is to provide a novel side post assembly having a side lap for sealing the side-plates which are held in side-by-side relation by the side post.

These and other objects and features of the present invention will become more apparent from the reading of the following descriptions.

SUMMARY OF THE INVENTION

The present invention is for use in connection with a trailer or the like having a body including side panels, a roof and a floor. The upper ends of the side panels and roof are supported by a top rail and the lower ends of the side panels and floor are supported by a frame assembly. The top rail includes a horizontal leg having a wing member extending from the horizontal leg end and a substantially vertical leg having a ledge extending therefrom. The side panels comprise a plurality of vertical side plates having substantially abutting edges, a plurality of side laps respectively covering each pair of side plates, and a plurality of side posts overlying said side laps and said plates.

BRIEF DESCRIPTION OF THE DRAWINGS

The features of the present invention which are believed to be novel are set forth with particularity in the appended claims. The organization and manner of operation of the invention, together with further objects and advantages thereof, may best be understood by reference to the following description taken in connection with the accompanying drawings in which:

FIG. 4 is a sectional view of a trailer body taken along line 4—4 of FIG. 2;

FIG. 5 is an enlarged fragmentary view of a portion of the trailer body within circle 5 in FIG. 1.;

FIG. 6 is a sectional view taken along line 6—6 of FIG. 5; and

FIG. 7 is a perspective side sectional view as shown in FIGS. 5 and 6.

DETAILED DESCRIPTION OF THE ILLUSTRATED EMBODIMENT

Figure 1:
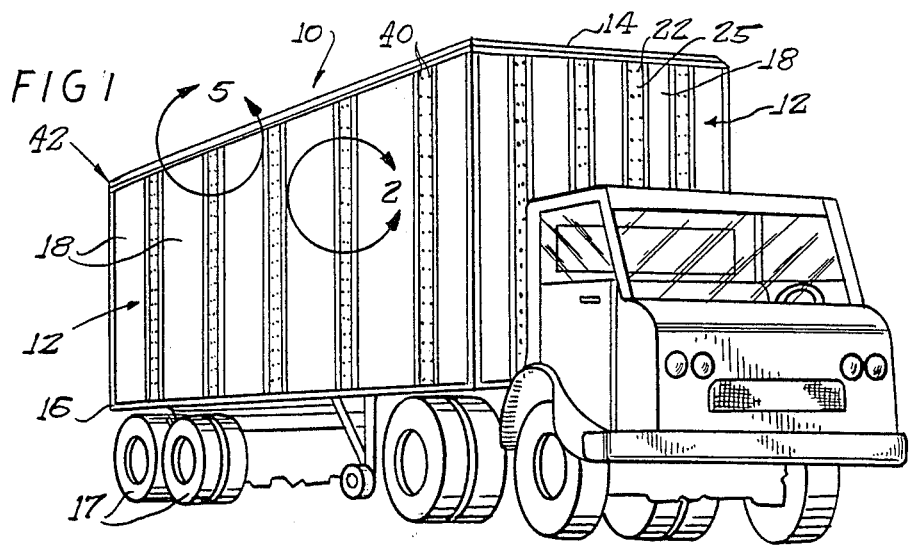
FIG. 1 is a perspective view showing a trailer body structure incorporating the features of the present invention.

Turning to the drawings, wherein like components are designated by like reference numerals throughout the various figures, a trailer body, constructed in accordance with the present invention, is illustrated in FIG. 1 and generally designated by reference number 10.

The trailer body 10, includes rectangular side panels 12, a top panel or roof 14 and a floor assembly (not shown). The floor assembly and the lower portion of the side panels 12 are suitably secured to a lower frame assembly 16 and are supported by rear wheel assembly 17.

Figure 2:
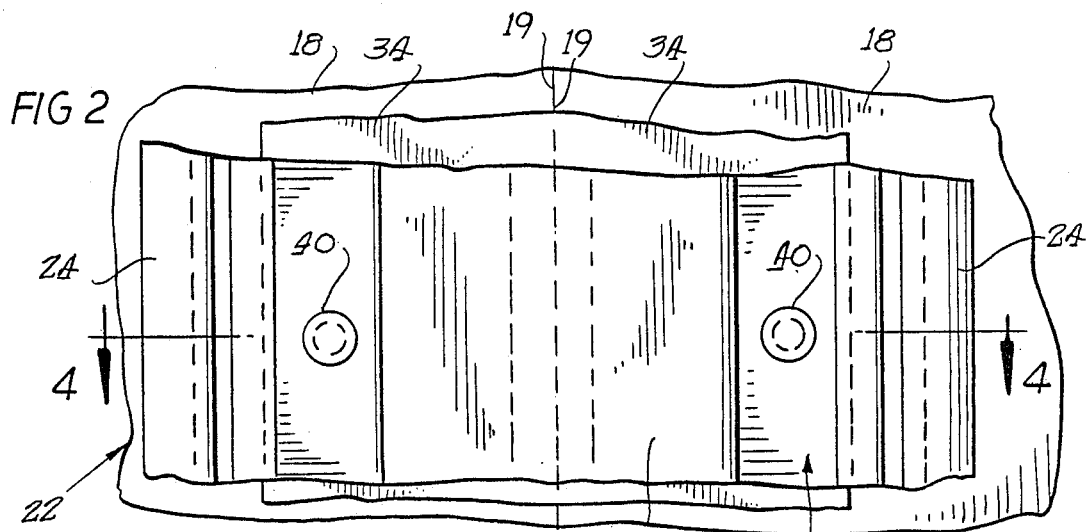
FIG. 2 is an enlarged fragmentary view of a portion of the trailer body within circle 2 of FIG. 1.
Figure 3:
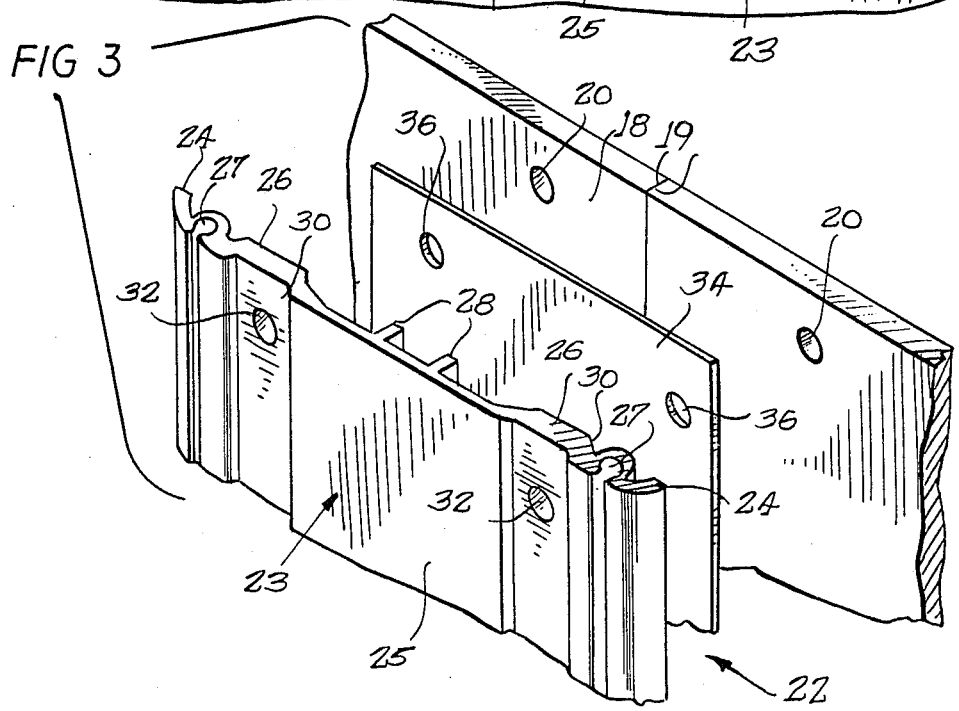
FIG. 3 is an exploded perspective view of the trailer body portion shown in FIG. 2.

As shown in FIGS. 2 and 3, the side panels 12, include a plurality of pairs of vertical aluminum side plates 18 which are positioned in side-by-side relation. The adjacent pairs of aluminum side plates have substantially abutting side edges 19. The aluminum plates 18 also include a plurality of first preformed apertures 20. The apertures 20 are appropriately spaced between the upper and lower ends or margins of the side plates 18. These apertures 20 will be discussed in detail below. The members 18 are designated plates since they are preferably formed from heavy gauge aluminum which for example may be on the order of 0.190 inch.

The adjacent plates 18 of each pair are held in side-by-side relation so that the edges 19 substantially abut each other by a plurality of hollow, box-like post structures 22. As shown best in FIGS. 2-7, the box-like structures 22 include an elongated side post 23 and an inner sheet member or side lap 34. The side lap 34 is preferably made of a relatively thin sheet of metal such as aluminum which, for example, may be about 0.050 inch. The side lap 34 has a plurality of second apertures 36 suitably spaced from the upper ends and lower ends of the side lap 34.

The side post 23 is preferably made of extruded metal such as aluminum. The side post 23 includes curved marginal portions 24, outer side flange portions 26, a central section 25, and spaced apart middle flange portions 28, projecting perpendicularly inwardly from the central section 25. The marginal portion 24, flanges 26 and flanges 28 have inwardly facing edges disposed in a common plane so that they are all adapted simultaneously to bear against the side lap 34. In addition, side post 23 includes U-shaped channels 27 between the outer portions 26 and marginal portions 24. The U-shaped channels 27 are adapted to receive cables, wires and the like (not shown). The side post also includes a plurality of third apertures 32 suitably spaced from the upper and lower ends of the side posts 23.

The outer curved margins 24, the outer flanges 26, and middle flanges 28, abut side lap 34 when the parts are riveted or bolted together. Thus constructed the box-like structure or assembly 22 increases the strength and rigidity of the side panels 12. In addition, the box-type structure 22 is relatively economical and simple to manufacture.

As shown best in FIGS. 2–5, the box-like structure 22 overlays the outer side wall of adjacent vertical side plates 18. The apertures 20, 36 and 32 of the side plates 18, side lap 34 and side post 23 respectively are aligned and side plate fasteners 40 extend through the apertures for securing the box-type structure 22 to the adjacent side plates 18. It is to be noted that the overall thickness of the composite side post 22 is preferably only about 0.375 inch. Thus, the relatively stiff yet thin side posts in combination with the plates 18 enable the trailer body to be built with a maximum interior width without exceeding the legally permissable exterior width for permissable highway travel. This enables the trailer to have significantly increased capacity as compared with conventional trailers for receiving certain types of loads such as pallitized containers. This particular post structure also provides significantly improved strength and rigidity in combination with economy as compared with heretofor suggested plate-type trailers.

As shown best in FIGS. 6 and 7, a top rail 42 preferably formed of extruded aluminum extend the entire length of the upper-ends of the vertical side panels 12 for supporting the side panels 12 and securing the top panel 14.

The top rail 42 is provided with a substantially vertipcal leg 44 having an outwardly extending ledge 46 and a substantially horizontal leg 48 having a wing member 50 extending from a predetermined point on said horizontal leg 48 Leg 44 has a plurality of apertures 49 for receiving a fastener 52. As shown in FIGS. 6 and 7, side lap 34 extends vertically from the upper and lower ends or margins of the vertical side plates 18 covering the abutting edges 19 of the side plates 18. Further, the side lap 34 and side plates 18 overlap a substantial portion of the inside of the vertical leg 44 of top rail 42. Apertures 20 and 36 of the side plates and side lap 34 respectively are aligned with aperture 49 of leg 44, and fasteners 52 are extended through said apperturs for securing the upper margins of the side plates 18 and side lap 34 with the top rail 42. The wing member 50 is provided with aperture 54 for receiving fastener means 56. The top panel 14 has apertures 58 which are aligned with apertures 54 of wing member 50. Fastener 56 extends through these apertures for securing the top panel 14 with the top rail 42.

As shown in FIGS. 6 and 7, the side post 23 is dimensioned so that it terminates at a predetermined point below the ledge 46 of the top rail 42, thereby creating a gap 60 between the top rail 42 and the side post 23. As previously indicated, the side lap 34 extends vertically from or beyond the top end or margin and bottom end or margin of the vertical side plate 18. Thus constructed, the side lap overlaps the space 60 between the ledge 46 of the top rail 42 and the side post 23. Accordingly, side lap 34 effectively seals any space between the abutting edges 19 of the adjacent side plates 18 thereby preventing water leakage.

While a particular embodiment of the invention has been shown, it should be understood, of course, that the invention is not limited thereto since many modifications may be made. It is, therefore, contemplated to cover the present invention and any such modifications as follows in the true spirit and scope of the appended claims.

The invention is claimed as follows:

1. In a trailer body having side panels, a roof supported by a top rail assembly and a floor supported by a frame assembly, said panels comprising a plurality of adjacent pairs of vertical side plates having substantially abutting edges and upper and lower margins, a plurality of side laps covering said edges and a plurality of side posts respectively overlying said side laps and side plate, said side posts including flange portions abutting said side laps thereby providing a box-like side post.

2. A trailer body of claim 1, wherein said side plates, side laps and side posts include preformed apertures respectively and fasteners extending through said apertures and securing said side posts and side laps to said adjacent pairs of side plates.

3. A trailer body of claim 1, wherein said side laps extend substantially vertically between said upper and lower margins of said side plates.

4. A trailer body of claim 1, wherein said side posts terminate substantially below said upper margin of said side plate.

5. A trailer body of claim 1, wherein said side posts are made of extruded aluminum.

6. A trailer body of claim 1, wherein said side post includes U-shaped means for receiving cables and the like.

7. In a trailer body having side panels, and a roof, said roof being secured to a top rail having a substantially vertically extending leg, said panels comprising a plurality of upstanding adjacent vertical edges and first apertures, a plurality of side laps respectively covering edges of each pair of adjacent plate members and having second apertures aligning with first apertures, side posts having flange portions abutting said side lap and third apertures aligning with said first and second apertures, and fasteners extending through said apertures securing said side posts and side laps to each pair of adjacent side plates, said side posts terminating below said edge of said top rail.

8. A trailer body of claim 7, wherein said side lap extends vertically between upper and lower ends of each pair of side plates and overlaps said vertical leg of said top rail.

9. A trailer body of claim 7, wherein said side posts and said side lap provide a hollow box-type structure.

10. A trailer body of claim 7, wherein said side posts are made of extruded aluminum.

11. A trailer body of claim 7, wherein said post includes U-shaped means for receiving cables and the like.

12. A trailer body having side panels and a roof and upper ends of said panels, said roof secured to a top rail said top rail including a vertical leg; said panels comprising a plurality of vertical side plates having substantially abutting vertical edges, a plurality of side lap members respectively overlaying edges of each pair of said adjacent plate members, and a plurality of side posts abutting said side lap, said side lap members and side plates overlapping said vertical leg of said top rail and said side post terminating below said top rail.

13. A trailer body of claim 12, wherein said side plates, side laps and side posts include preformed apertures and fasteners extending through said apertures securing said side posts and side laps to each pair of adjacent side plates.

14. A trailer body of claim 12, wherein said side posts include outer marginal portions, outer flange portions, a central section between said flange portion, and a pair of spaced apart middle flange portions projecting laterally from said central section, said outer marginal portions and outer and inner flange portions abutting said side lap thereby providing a box-like structure.

15. A trailer body of claim 12, wherein said side posts are made of extruded aluminum.

16. A trailer body of claim 12, wherein said side posts includes a substantially U-shaped channel for receiving cables and the like.

17. In a trailer body having side panels, and a roof, said roof being secured to a top rail having a substantially vertically extending leg, said panels comprising a plurality of upstanding adjacent pairs of plate members having substantially abutting vertical edges and first apertures, a plurality of side laps respectively covering edges of each pair of adjacent plate members and having second apertures aligning with first apertures, side posts having flanged portions abutting said side lap and third apertures aligning with said first and second apertures, and fasteners extending through said apertures securing said side posts and said side laps to each pair of adjacent side plates, said side posts and said side laps providing a hollow box-type structure.

18. A trailer body of claim 17, wherein said side lap extends vertically between upper and lower ends of each pair of side plates a sand overlaps vertical leg of said top rail.

19. A trailer body of claim 17 wherein said side posts terminate below said ledge of said top rail.

20. A trailer body of claim 17, wherein said side posts are made of extruded aluminum.

21. A trailer body of claim 17, wherein said side posts includes a U-shaped means for receiving cables and the like.

* * * * *